United States Patent [19]
Godbehere

[11] Patent Number: 6,042,916
[45] Date of Patent: Mar. 28, 2000

[54] COMPOSITE MATERIAL CONSTRUCTION

[75] Inventor: Andrew Godbehere, Bristol, United Kingdom

[73] Assignee: British Aerospace Public Limited Company, Farnborough, United Kingdom

[21] Appl. No.: 08/921,479

[22] Filed: Sep. 2, 1997

[30] Foreign Application Priority Data

Sep. 2, 1996 [GB] United Kingdom ............... 9618316

[51] Int. Cl.⁷ ...................................................... B32B 5/26
[52] U.S. Cl. ................................. 428/57; 428/59; 428/60; 428/77; 428/298.1; 428/300.7

[58] Field of Search .................................. 428/57, 59, 60, 428/77, 300.7, 298.1, 108, 109, 113

*Primary Examiner*—Elizabeth M. Cole
*Attorney, Agent, or Firm*—Nixon & Vanderhye P.C.

[57] ABSTRACT

A composite material construction is provided including a laminate of plies (1, 2, 3, 6, 7) arranged with at least one warp dominated ply (7), alternating with at least one weft dominated ply (1, 2, 3) in a thickness direction and at least two weft dominated plies (1, 2, 3) and at least one warp dominated ply (7) arranged in a width direction in which the width of the at least one warp dominated ply (7) is greater than that of each weft dominated ply (1, 2, 3) and in which the weft dominated plies (1, 2, 3) form a lap joint (4, 5) with each other.

11 Claims, 1 Drawing Sheet

COMPOSITE MATERIAL CONSTRUCTION

BACKGROUND TO THE INVENTION

This invention relates to the construction of composite materials, in particular to the construction of a composite material from so called non crimp fabrics in which structural fibres are substantially unwoven, and most particularly to the construction of such materials for use in aircraft structures with particular reference to aerofoils.

DESCRIPTION OF THE PRIOR ART

It is known to produce a material constructed of several layers of multiaxial non crimp fabric each having a collection of different fibre orientations, for example zero degrees, +45 degrees, −45 degrees, 90 degrees. It will be understood that the orientations given are by way of example only. For such constructions to be manufactured in widths over about 1.75 meters however currently requires fabric butting or overlap of all layers of the construction to achieve such greater widths. In the case of unidirectional composite materials plies or layers of fibrous reinforcing material are butted together with fibres along one edge of each ply lying adjacent the fibres along an abutting edge of the other ply. Impregnation with resin and subsequent curing of the resin renders a structurally sound joint along the abutment. However where multiaxial fabrics are to be joined together certain plies will inevitably need to be abutted such that fibre ends of one ply are in abutment with fibre ends of the adjacent ply. This arrangement will form a structurally weak joint where the ends meet. Alternatively a lap arrangement is required which involves all orientations of the non crimp fabric.

To alleviate this problem it is known to produce multiaxial non crimp fabric material in which plies whose fibres are arranged in one orientation, eg 0 degrees, are manufactured in a narrower width than plies with fibres in another orientation, eg + or −45 degrees. In this way the plies with the + or −45 degrees orientation may be overlapped to the extent that they are wider than the 0 degree ply. The 0 degrees ply may be abutted with an adjacent 0 degrees ply. A Structurally sound joint results with the increased material thickness which occurs over the lapped area of the joint being of a relatively small area in relation to an overall area of the component and not involving all orientations of the construction. This design has the warp dominated plies narrower in width than the weft plies, ie the 0 degrees plies narrower than the + or −45 degrees plies. By warp dominated plies is meant plies where the large majority, eg 90% or more, of fibre material lies in the warp direction with only the remaining 10% or less being in a weft direction. By weft dominated plies is meant plies where the large majority, eg 90% or more, of fibre material lies in a weft direction.

SUMMARY OF THE INVENTION

According to the invention there is provided a composite material construction including a laminate of plies arranged with at least one warp dominated ply alternating with at least one weft dominated ply in a thickness direction and at least two weft dominated plies and at least one warp dominated ply arranged in a width direction in which the width of the at least one warp dominated ply is greater than that of each weft dominated ply and in which the weft dominated plies form a lap joint with each other.

Preferably the at least one warp dominated ply extends for the entire width of the construction. Alternatively at least two warp dominated plies may abut one another. In each case a strong construction is formed.

The invention provides a method of construction which removes the need to form the warp dominated plies in connection with the weft dominated plies. They may be manufactured entirely separately and on different machinery and only brought together for final construction. This aspect of the invention may find particular advantage in the construction of aircraft wing skins and other broad goods manufacture where strength is a pre requisite.

BRIEF DESCRIPTION OF DRAWINGS

The invention will now be described by way of example with reference to the accompanying drawings of which.

DESCRIPTION OF PREFERRED EMBODIMENT

Figure 1:
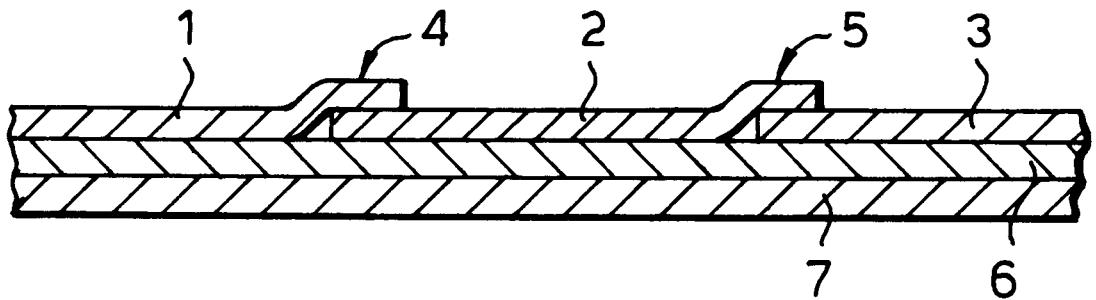
FIG. 1 is a schematic transverse sectional view of a first construction according to the invention.

Referring to FIG. 1, three weft dominated fabrics 1, 2, 3, each comprising plies of +45 degrees and −45 degrees orientation are arranged in lapped relationship at joints 4, 5. Underneath lies a full width weft dominated 90 degree orientation ply 6 and underneath that a warp dominated 0 degree orientation ply 7. It will be noted that the ply 7 is wider than the plies 1, 2, 3. Because of this, at any joint location such as 4 or 5, it is only necessary to increase the overall thickness of the construction by the thickness of the fabric 1 or 2 and not by an overlap of the whole thickness of the construction.

Figure 2:
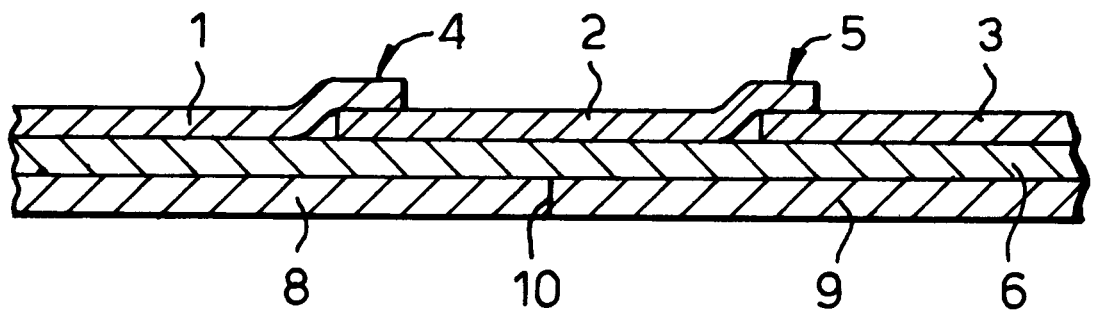
FIG. 2 is a schematic transverse sectional view of a second construction according to the invention.

In FIG. 2 a construction according to a second embodiment of the invention is shown with like features being gives like reference numerals for consistency, It will be noted here that the warp dominated ply 7 of FIG. 1 has been replaced by two warp dominated plies 8, 9 forming a butt joint together at 10. As explained above, such a butt joint of warp dominated plies wherein the fibres run parallel with the joint is considered acceptable and forms a strong joint when plastics matrix material, for example epoxy resin cures and hardens across the joint. It will be observed that the same advantage of reduced thickness increase at joints 4 and 5 still obtains in this construction, with the joint 10 adding no additional thickness to the construction at all.

What is claimed is:

1. A composite material construction including a laminate of layers arranged with at least one warp dominated layer alternating with at least one weft dominated layer in a thickness direction and, wherein said at least one weft dominated layer comprises at least two weft dominated plies and said at least one warp dominated layer comprises at least one warp dominated ply, at least one of said at least two weft dominated plies forming at least one lap joint with an other of said at least two weft dominated plies, and each of said at least two weft dominated plies and said at least one warp dominated ply having a width dimension, wherein the width of the at least one warp dominated ply is greater than the width of at least one of said at least two weft dominated plies, wherein said construction includes a plastics matrix material.

2. A composite material construction as in claim 1, said construction having a width in which the at least one warp dominated layer extends for the entire width of the construction.

3. A composite material construction as in claim 1 wherein said at least one warp dominated layer comprises at least two warp dominated plies in which said at least two said warp dominated plies (8, 9) abut one another.

4. A composite material construction as in claim 3, wherein said abutment and said lap joint are staggered in a width direction.

5. An aircraft skin panel incorporating a composite material construction as in claim 1.

6. A composite material construction as in claim 1, wherein said at least one weft dominated layer comprises two weft dominated layers.

7. A composite material construction as in claim 6, wherein said at least one warp dominated layer is comprised of a 0 degree orientation ply, one of said at least two weft dominated layers is comprised of a 90 degree orientation ply, and each of said at least two weft dominated plies is comprised of a +45 and −45 degree orientation ply.

8. A composite material construction as in claim 7, wherein said 90 degree orientation ply is located in a thickness direction between said 0 degree orientation ply and said weft dominated layer comprised of +45 and −45 degree orientation plies.

9. A composite material construction as in claim 1, wherein each of said plies is comprised of a non crimp fabric material.

10. A composite material construction as in claim 1, wherein said plastics matrix material comprises an epoxy resin material.

11. A composite material construction as in claim 1, wherein said construction includes a polymeric resin.

* * * * *